April 8, 1958  C. E. PARKER  2,829,759
SHEET HANDLING APPARATUS
Filed March 29, 1955  3 Sheets-Sheet 1

INVENTOR
CLARENCE E. PARKER
BY Hudson, Boughton
Williams, David & Hoffman
ATTORNEYS April 8, 1958
C. E. PARKER
2,829,759
SHEET HANDLING APPARATUS
Filed March 29, 1955
3 Sheets-Sheet 2
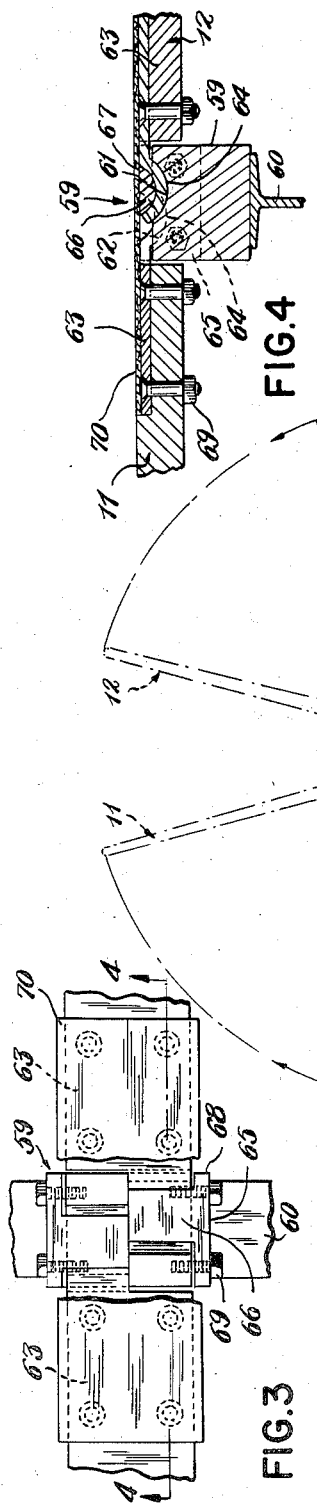
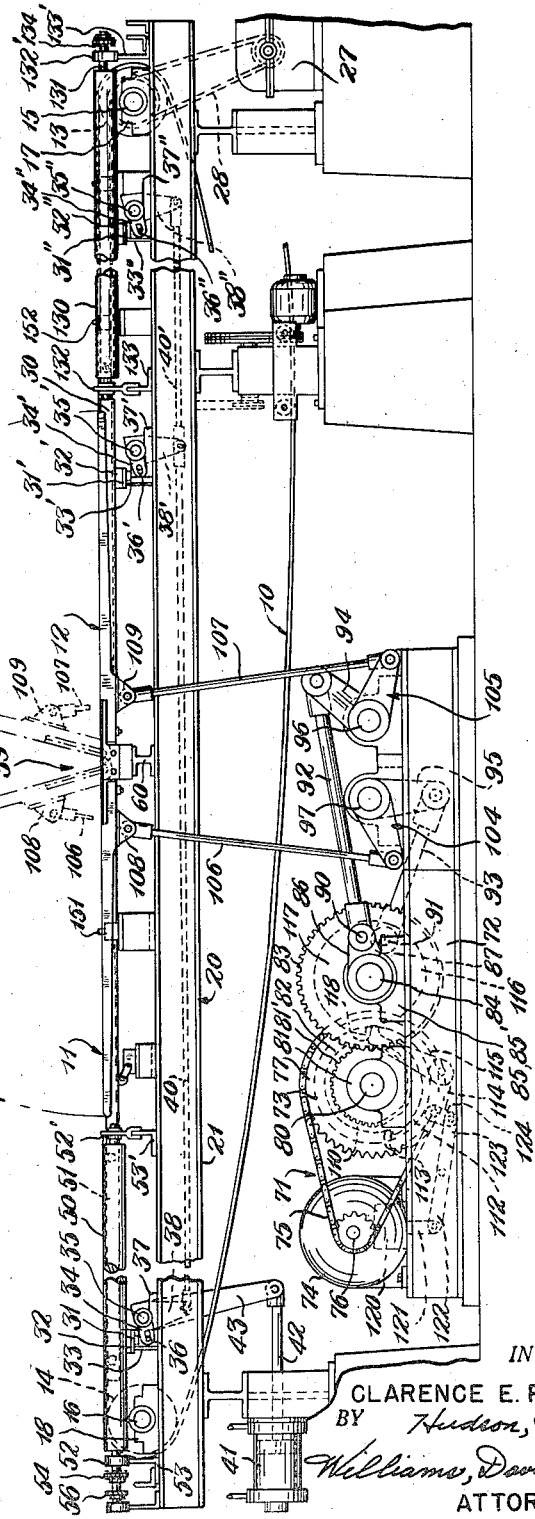
INVENTOR.
CLARENCE E. PARKER
BY Hudson, Boughton,
Williams, David & Hoffman
ATTORNEYS April 8, 1958 C. E. PARKER 2,829,759
SHEET HANDLING APPARATUS
Filed March 29, 1955 3 Sheets-Sheet 3

INVENTOR.
CLARENCE E. PARKER
BY Hudson, Boughton,
Williams, David & Hoffmann
ATTORNEYS

United States Patent Office 2,829,759
Patented Apr. 8, 1958

2,829,759

SHEET HANDLING APPARATUS

Clarence E. Parker, Painesville, Ohio, assignor to The Coe Manufacturing Company, Painesville, Ohio, a corporation of Ohio Application March 29, 1955, Serial No. 497,551

7 Claims. (Cl. 198—33)

The present invention relates to apparatus for handling material in sheet form and, more particularly, to sheet material handling apparatus for overturning sheets of material, such as plasterboard and the like.

The principal object of the invention is the provision of a novel and improved apparatus for conveying material in sheet form and overturning the same during its passage through or over the apparatus, which apparatus will be simple in construction, relatively inexpensive to manufacture, but which will be positive and reliable in operation and capable of handling sheets of relatively fragile material without damage, such as large sheets of plasterboard.

Another object of the invention is the provision of a novel and improved sheet material handling apparatus of the character referred to comprising spaced, parallel conveyor members for moving sheet material thereon in a generally horizontal plane, and two series or rows of oppositely facing, lever-like members interspaced between the conveyor members and supported for movement from a generally horizontal position below the conveyor members to a generally vertical position above the conveyor members, in combination with means for oscillating the lever-like members in timed relation to the movement of a sheet of material by said conveyor members whereby material positioned above one of said rows of lever-like members by the conveying members is overturned by said lever-like members and subsequently removed by the conveying members.

Another object of the invention is the provision of a novel and improved apparatus for overturning sheet material, such as plasterboard and the like, adapted to cooperate with a plurality of spaced, parallel conveyor members, and which apparatus comprises two or more rows of lever-like members adapted to be interposed between the conveyor members and supported for movement from a generally horizontal position below the conveyor members to a generally vertical position above the conveyor members, in combination with means for oscillating the lever-like members whereby a sheet of material positioned thereabove by the conveying members is overturned by said lever-like members.

The invention resides in certain constructions and combinations and arrangements of parts and further objects and advantages thereof will be apparent to those skilled in the art to which it relates from the following description of the preferred embodiment described with reference to the accompanying drawings forming a part of this specification in which similar reference characters designate corresponding parts, and in which:

Fig. 2 is an end elevational view taken approximately on the line 2—2 of Fig. 1;

Fig. 3 is a fragmentary plan view of the hinge structure for the sheet material, overturning, lever-like members of the apparatus;

Fig. 4 is a fragmentary, sectional view taken approximately on the line 4—4 of Fig. 3.

Figure 1:
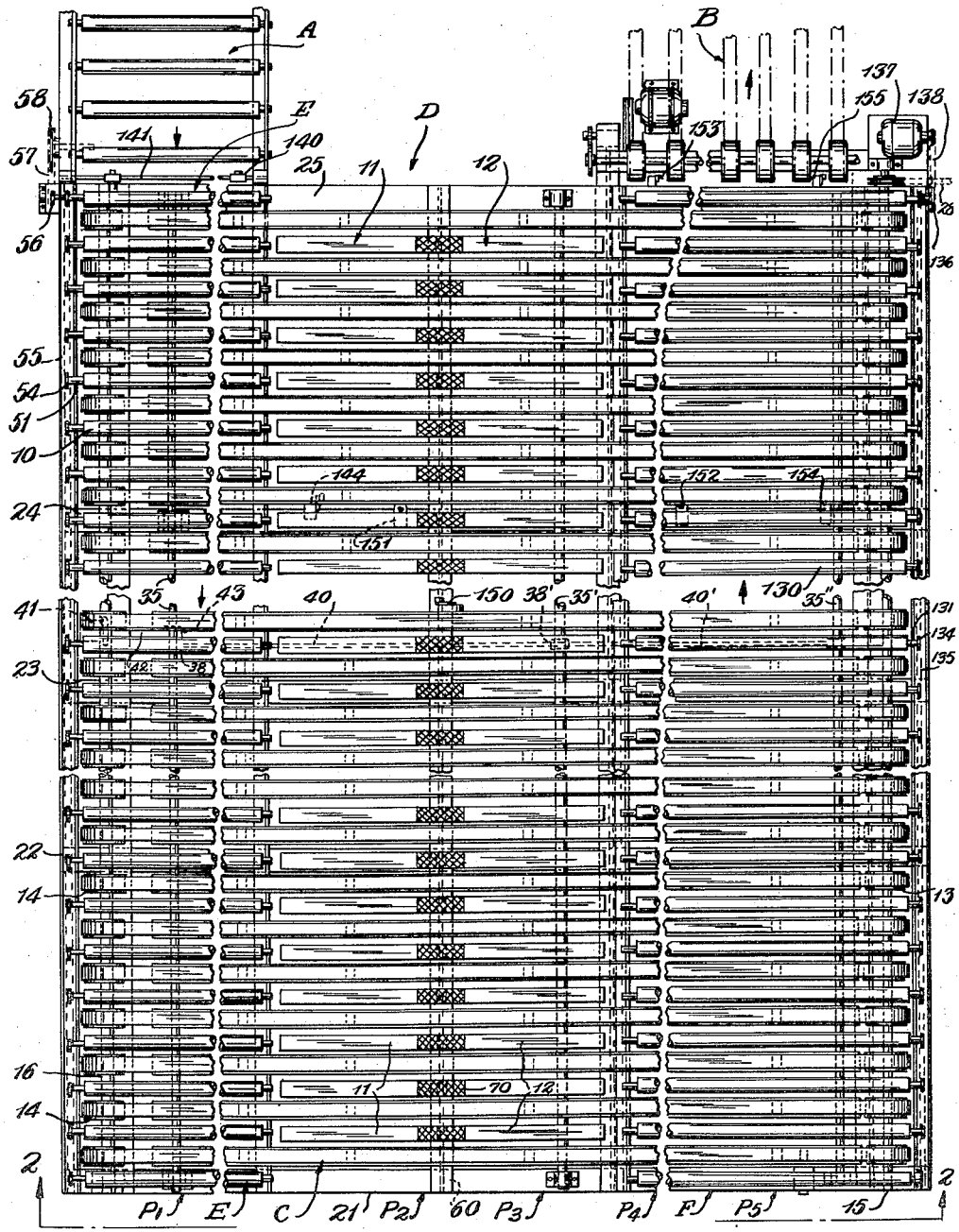
Fig. 1 is a plan view of an apparatus embodying the invention designed to transfer material in sheet form, such as plasterboard and the like, from one conveyor to another, and overturn the sheets during their transfer.

Although it is to be understood that the invention may be otherwise embodied, it is herein shown and described as embodied in an apparatus for transferring sheets of plasterboard and the like between two spaced, parallel conveyors and overturning the sheets of plasterboard during their transfer from one conveyor to the other. The apparatus shown in the drawings is specifically designed to take sheets of material, for example plasterboard, from a first conveyor A, hereinafter called the supply or feed conveyor, and whereon the sheets of plasterboard are supported and moved in tandem relationship, that is, one sheet behind the other, and transfer them to a second conveyor B, hereinafter called the take-away or removal conveyor, and whereon they are supported and moved in pairs, with the sheets of each pair arranged in side-by-side relationship. During the progress of one sheet from the supply conveyor A to the take-away conveyor B, the sheet progresses through the apparatus in what may be called steps, alternate sheets assuming four and five different positions in the apparatus, as will be hereinafter described.

The apparatus shown comprises a transfer conveyor designated C comprising a plurality of conveyor members, in the present instance endless belts 10 extending from the discharge end of the supply conveyor A to the entrance end of the take-away conveyor B, and a turnover apparatus, designated D, comprising two rows of lever-like members 11, 12 respectively, the lever-like members of each row alternating with the belts 10. The ends of the lever-like members 11, 12 adjacent to each other are supported for pivotal movement and as a plasterboard is moved to a position above the row of the lever-like members 11 both rows of lever-like members 11, 12 are rotated to a generally vertical position, with the belts 10 preferably stationary, to transfer the plasterboard from the rows of lever-like members 11 to the row of lever-like members 12 which, when returned to their original or starting position, again position the sheet of plasterboard on the top reaches of the belts 10, it being understood that the lever-like members 11, 12 are normally below the top plasterboard engaging and supporting reaches of the belts 10.

The position occupied by a plasterboard when it is on the endless belts 10 and above the lever-like members 11 is hereinafter referred to as the second position, and designated in the drawings P–2, the first position, designated P–1, being the position which it occupies at the end of its travel along the supply conveyor A and just before it starts its transverse movement towards the removal conveyor B. The third position designated P–3 is that occupied by a plasterboard as it is deposited on the upper reaches of the belts 10 by the row of lever-like members 12. From the last mentioned or third position the plasterboards are moved to a fourth position designated P–4 in line with the near side of the take-away conveyor B and alternate boards to a fifth position designated P–5 in line with the far side of the removal conveyor B. From the fourth and fifth positions the plasterboards S are simultaneously removed in pairs by the removal conveyor B. It is to be understood that as the plasterboards are moved from position to position the position vacated by one plasterboard is immediately occupied by the following plasterboard with the exception of the first and fifth positions which latter position is occupied by alternate plasterboards.

In the event the conveyor members or endless belts 10 are a part of the supply conveyor the so-called first position could be eliminated. It is also to be understood that the overturned sheets could be removed in tandem relationship, either lengthwise or crosswise, and either or both of the so-called fourth and fifth positions eliminated if desired. Other modifications will be hereinafter referred to and still others will be apparent to those skilled in the art.

Referring again to the preferred embodiment shown, the endless belts 10 are trained over head and tail pulleys 13, 14 mounted on head and tail shafts 15, 16 suitably journaled in rows of bearings 17, 18, respectively, which bearings are in turn mounted upon a supporting structure 20. The supporting structure 20 comprises spaced I-beam members 21, 22, 23, 24, 25. The shafts 15, 16 are located adjacent to the outer sides of the feed and removal conveyors A, B and provide sufficient space on the top reaches of the endless belts 10 for five sheets of plasterboard, one in each of the five equally spaced side-by-side positions P–1, P–2, P–3, P–4 and P–5. The head shaft 15 and in turn the belts 10 are adapted to be driven by an electric motor driven gear reduction 27 and a sprocket chain drive 28.

The top reaches of the endless belts 10 are supported upon shoes 30, in the present instance T-beams extending from the head pulleys 13 to the tail pulleys 14. The top horizontal portions of the T-beams are positioned adjacent to the bottom surfaces of the top reaches of the endless belts and the vertical webs of the T-beams are each supported by three spaced vertical rods or pins 31, 31', 31'' suitably fixed thereto. The rods 31, 31', 31'' for the respective shoes 30 are slidably mounted in vertical guide bearings 32, 32', 32'', respectively, which bearings are in turn welded to angle irons 33, 33', 33'', respectively, supported on the tops of the I-beams 21, 22, 23, 24, 25.

The individual rods 31, 31', 31'', for each shoe 30 and, in turn, the shoes are adapted to be moved vertically by generally horizontally positioned levers 34, 34', 34'' fixed to transversely extending shafts 35, 35', 35'', respectively, and having their projecting end slotted longitudinally to receive pins 36, 36', 36'', respectively, projecting from adjacent to the lower ends of the rods 31, 31', 31'', respectively. The shafts 35, 35', 35'' are journaled in rows of five pillow blocks 37, 37', 37'' positioned on top of the T-beams 21, 22, 23, 24, 25, respectively. The shafts 35, 35', 35'' are rotated in unison to raise the shoes 30 uniformly to an elevated position by means of levers 38, 38', 38'' fixed to the shafts 35, 35', 35'', respectively, and having their other end connected together by rods 40, 40'. The shafts 35, 35', 35'' may be actuated in any convenient manner and, as shown, are operated by a fluid pressure motor 41, the piston rod 42 of which is pinned to one end of a lever 43, the other end of which is fixed to the shaft 35.

The particular transfer mechanism shown in the drawings, as previously stated, is designed to receive and discharge sheets of plasterboard and the like in a direction transversely of the endless belts 10, and the apparatus shown comprises a first or receiving conveyor E which in effect forms a continuation of the feed conveyor A, and which conveyor E in cooperation with the feed conveyor A moves or carries the sheets of plasterboard into the first position P–1. The conveyor E comprises a plurality of power driven rollers 50, the individual rollers of which are positioned between the endless belts 10 with the tops of the rollers extending slightly above the top reaches of the belts. Each roller 50 comprises a center shaft 51, the projecting ends of which are journaled in bearings 52, 52', respectively, fixed to upstanding legs of angle irons 53, 53', respectively, which, in turn, extend across and are supported on the tops of the I-beams 21, 22, 23, 24, 25. The left hand end of the center shaft 51 of each of the rollers 50, as viewed in Fig. 2, extends beyond its support bearing 52 and is provided with a sprocket wheel 54 adapted to be driven by an endless chain 55 connected to the sprocket wheels of the respective rollers. The center shaft of the upper end roller 50, as viewed in Fig. 1, extends beyond the sprocket wheel 54 thereof and is provided with another sprocket wheel 56 driven by chain 57 from a sprocket wheel 58 adapted to be driven by a motor not shown in the drawing.

The overturning device D shown in the drawings comprises two rows of lever-like members 11, 12 with one member of each row aligned with one member of the other row and with each pair of aligned lever-like members positioned in the space between two adjacent endless belts 10 to form pairs of lever-like members 11, 12 arranged end to end and interspaced between the belts 10. The adjacent ends of each pair of members 11, 12 are spaced slightly apart and are hinged to individual hinge blocks 59, one for each pair, positioned on top of a transversely extending I-beam 60 fixed to the top of the I-beams 21, 22, 23, 24, 25. The top surface of each of the hinge blocks 59 is positioned a short distance below the top horizontal surfaces of the members 11, 12 and is provided with a pair of cylindrically shaped recesses or depressions 61, 62 each of which extends transversely of the block 59, that is, crosswise of the belts 10 for half of its width. The recesses 61, 62 are offset or spaced apart lengthwise of the arms 11, 12, a distance slightly greater than the thickness of the material to be handled by the transfer mechanism.

Each of the adjacent ends of the lever-like members 11, 12 is provided with a flat hinge plate 63 of a width substantially equal to that of the members and fixed in the end of the members so that its top surfaces lie slightly below the top of the lever-like members. Each plate 63 has a projecting portion of a width equal to one-half that of the hinge block 59 and offset to the side of the lever block corresponding to the closest of the cylindrically-shaped depressions 61, 62 in its respective hinge block.

The portions of the hinge plates 63 overlying the cylindrical depressions in their respective hinge blocks 59 are arcuately shaped as at 64 such that their bottom surfaces correspond to the curvature of the cylindrical depressions 61, 62 and such that they seat therein. The top surfaces of the hinge plates 63 are likewise arcuately shaped and the hinge plates are held in contact with the hinge blocks by individual retaining plates 65 each having a horizontal cylindrical segment 66 positioned on top of the adjacent arcuately shaped portion 64 of the hinge plate 63 with which it is associated and with the flat top surface 67 of the segments 66 flush with the top horizontal surface of the hinge plate. The retaining plates 65 are fastened to the hinge blocks 59 by means of vertical flanges 68 formed integrally with the cylindrical segments 66 and fastened to the adjacent vertical side surface of the hinge block 59 as by bolts 69. A piece of leather or the like 70 is positioned over each of the hinge blocks 59 and the cooperating hinge plates 63 to prevent damage to the edges of the material as it is overturned by the pairs of lever-like members 11, 12. The thickness of the leather 70 or other material used, is preferably such as to form a flush continuation of the top surfaces of the lever-like members to which it is connected.

The lever-like members 11, 12 are adapted to be moved about their pivots between generally horizontal and vertical positions, approximately as indicated by full and dot-dash lines in Fig. 2, by an electric motor driven drive assembly generally indicated at 71. The drive assembly 71 is positioned beneath the supporting structure 20 of the transfer mechanism on a channel iron base 72 and comprises a three revolution clutch 73 driven by an electric motor 74 by means of a chain belt 75 and sprocket wheels 76 and 77. The clutch 73 comprises a horizontal shaft 80 rotatably supported in pillow blocks 81, 81' fixed upon the channel iron base 72 and the driven element of the clutch is provided with a gear wheel 82 in mesh with a second gear wheel 83 secured to a second horizontal shaft 84 mounted in pillow blocks 85, 85' also supported upon the channel iron base 72. The shaft 84 is in parallel relation with the shaft 80 of the clutch 73 and the ratio of the gears 82, 83 is 3:1 with the result that the shaft 80 makes three revolutions for each revolution of the shaft 84. The ends of the shaft 84 project outwardly from the pillow blocks 85, 85' and carry crank arms 86, 87 having horizontal crank pins 90, 91 respectively, projecting horizontally outwardly from their outer ends.

The crank pins 90 and 91 of the crank arms 86, 87 respectively, are connected by rods 92, 93 respectively, to crank arms or levers 94, 95, respectively, fixed to horizontal shafts 96, 97, respectively, positioned beneath the hinge structures for the members 11, 12 and extending transversely for the full width of the transfer mechanism. The shafts 96, 97 are each provided with a row of generally horizontally projecting levers 104, 105, respectively, which levers project in opposite directions beneath the respective rows of lever-like members 11, 12. The number of levers 104, 105 in each row corresponds to the number of members 11, 12 in the row immediately above, the individual levers 104, 105 being positioned directly below the individual members 11, 12 respectively. Each of the vertically aligned members 11, 12 and levers 104, 105, respectively, are connected by a connecting rod 106, 107, respectively. The lower ends of the rods 106, 107 are pinned to their respective levers and the upper ends are pinned to brackets 108, 109 bolted to the underside of the respective lever-like members at positions spaced from their pivot.

The crank arms 86 and 87 are positioned upon the shaft 84 so that the crank arms 86 and 87 and their connecting links 92, 93, respectively, are in alignment or dead center positions when the lever-like members 11, 12 are in their horizontal positions. Rotation of the shaft 84 from this position moves the members 11, 12 upwardly during the first 180 degrees of rotation of the shaft 84 and lowers them to their normal horizontal position during the second 180 degrees of rotation. Suitable means is provided in the present instance for insuring that shaft 84 stops its rotation exactly in the dead center position mentioned when the driving and driven elements of the clutch 73 are disengaged. The means shown includes a cam wheel 110 mounted on the shaft 80 of the three revolution clutch 73 and having a spiraled outer surface 112 that is provided with a radially extending shoulder 113 connecting the most radially inward and radially outward portions of the surface 112. A cooperating pawl 114 pinned to the base 72 beneath the clutch is provided such that the pawl 114 will engage the shoulder 113 of the spiral cam 110 and prevent further rotation of the driven element of the clutch. To prevent the pawl 114 from engaging the shoulder 113 during the first two revolutions of the three-revolution clutch's cycle, a second pawl 115 integrally connected to the first pawl 114 is adapted to engage an arcuate surface 116 on a cam 117 fixed to the shaft 84 and hold this pawl 114 in inoperative position while the shoulder 113 on the cam 110 passes the pawl 114 during the first two revolutions. A recess 118 in the outer surface of the cam 117 allows the second pawl 114 to engage the shoulder 113 as the clutch completes its third revolution and stops shaft 84 with the cranks 86, 87 in the dead center positions referred to. The pawls 114, 115 are adapted to be actuated to move the pawl 114 out of engagement with the shoulder 113 by means of a solenoid 120 the armature 121 of which is connected to one end of a lever 122 pinned to the frame adjacent its center, and the other end 123 of which is connected to the pawl 114 as by a link 124. Pawls 114, 115 also control a switch, not shown, which energizes a solenoid, not shown, adapted to engage the driving and driven elements of the clutch 73 whenever the pawls 114, 115 are rocked away from their cooperating cam surfaces. During operation of the clutch, the pawl 115 slides upon the arcuate surface 116 of the cam 117 and holds pawl 114 out of engagement with its shoulder 113 until after clutch 73 has made more than two revolutions. Just before shaft 84 completes its third revolution, pawl 115 rides into the recess or dwell 118, moving pawl 114 into position to engage the shoulder 113, and opening the switch which controls the operation of the clutch causing the clutch to disengage and rotation of the shafts 80, 84 to stop when the shoulder 113 engages the pawl 114.

The plasterboard supporting surface of the transfer mechanism is completed by a second or discharge roller conveyor F extending crosswise of the belts 10 in the fourth and fifth positions P–4 and P–5, respectively, of the transfer mechanism. The discharge conveyor F is quite similar to the receiving conveyor E excepting that it extends across two positions and comprises a plurality of rollers 130 each having a center shaft 131 the ends of which are journaled in bearings 132, 132' respectively, mounted upon the upwardly extending legs of angle irons 133, 133' which are mounted crosswise of the I-beam 21, 22, 23, 24, 25. The rollers 130 are positioned between the endless belts 10 with their tops at the same elevations as the rollers 50 of the receiving conveyor E and they are driven in a manner similar to the rollers of conveyor E. The ends of the center shafts 131 which project beyond the tail pulleys 14 are provided with aligned sprocket wheels 134 which in turn are connected by an endless chain 135. The center shaft 131 of the top end roller 130 as viewed in Fig. 1 is made slightly longer than the other center shafts and is provided with another sprocket wheel 136 driven by an electric motor 137 and an endless chain 138.

*Operation*

The transfer mechanism shown in the drawing is specifically designed to transfer plasterboards between the ends of two parallel spaced apart conveyors A, B, and as such, is positioned across the ends of the two conveyors. The transfer mechanism is supplied by the feed conveyor A terminating adjacent to the upper left hand corner of Fig. 1 and on which the plasterboards move one behind the other with a space between the plasterboards which is at least as great as the length of the plasterboards themselves. The receiving conveyor E of the transfer mechanism is aligned with the feed conveyor and is continually driven at a speed at least as great as the feed conveyor.

The transfer mechanism may be controlled in a number of ways employing timing devices, limit switches, etc., or combination thereof, and as shown, is controlled by limit switches as will now be explained. A plurality of feeler arms 140 depending from a horizontal shaft 141 are mounted across the discharge end of the feed conveyor A, or adjacent to the beginning of the receiving conveyor E of the transfer mechanism to sense the passing of the trailing end of a plasterboard fed to the transfer mechanism. Shaft 141 controls a switch 142 adapted to actuate a solenoid 143 to supply air pressure to the fluid pressure motor 41 which raises the top reach of the endless belts 10 to pick up the plasterboard which has been fed into the first plasterboard supporting position of the transfer mechanism P–1. A switch 144 positioned beneath one of the shoes 30 is adapted to start the electric motor driven gear reduction unit 27 which drives the endless belts 10 when the shoes are raised to their up or elevated positions. The plasterboard is thereupon carried sideways by the belts 10 into the second position P–2 until it strikes the actuation for a limit switch 150 attached to one of the shoes 22 adjacent the hinge structure of the overturning device C between the second and third positions. Limit switch 150 causes the gear reduction unit 27 to stop and at the same time actuates the fluid pressure motor 41 to cause the belts to be lowered.

As the plasterboard is lowered towards the lever-like members 11 in the second position, it actuates a switch 151 attached to I-beam 24 of the support structure 16 with its sensing button extending above the normal top level of the endless belts 10. The switch 151, in turn, actuates the solenoid 120 of the drive mechanism of the overturning device D, which releases the pawls 114, 115 and causes the clutch 73 to engage. The motor of the overturning device revolves continually and the plasterboard is raised to a generally vertical position by the row of members 11 sufficiently fast to cause the plasterboard to move past top dead center over against the row of members 12 which lowers the board into the third horizontal supporting position of the transfer mechanism.

While the mechanism D was being operated to overturn and advance the first plasterboard from the second position to the third, a second plasterboard was being fed to the receiving conveyor E by the feed conveyor A. As the mechanism D completes its cycle and the first plasterboard is placed in the third position, the end of the second plasterboard passes the feeler arms 140 to actuate fluid pressure motor 41 to cause the top reach of the endless belts 10 to become elevated as was done initially when the end of the first plasterboard passed the feeler arms 140.

The endless belts now, of course, picks up both the first plasterboard which is in the third position, and the second plasterboard which is in the first position, and moves them over one position, that is, until the second plasterboard strikes limit switch 150, whereupon movement of the endless belts 10 is stopped and they are lowered as was initially described for the first plasterboard. This now places plasterboards in the fourth and second positions respectively, whereupon the second plasterboard actuates switch 151 and is flipped over by the overturning mechanism D into the third position in the same manner as was described above for the first plasterboard. While the second plasterboard was being flipped over by the overturning device D, a third plasterboard was being fed to the receiving conveyor E by the feed conveyor A. Shortly after the second plasterboard is placed in the third position, the end of the third plasterboard passes the feeler arms 140 and the endless belts are again elevated.

The endless belts now, of course pick up the first, second and third plasterboards in the fourth, third and first positions respectively and move them over one position. This places the plasterboards in the fifth, fourth and second positions respectively. The third plasterboard now strikes limit switch 150 and causes the endless belts 10 to be stopped and lowered, whereupon the first and second plasterboards are lowered upon the discharge conveyor F which extends across both the fourth and fifth positions.

A series of four switches 152, 153, 154 and 155 connected in parallel electrical circuit are positioned two each in the fourth and fifth positions, with switches 152 and 154 being attached to I-beam 24 and extending slightly above the normal positions of the endless belts 10 and the switches 153 and 155 being attached to the I-beam 25 adjacent the end of the discharge conveyor F. When the first and second plasterboards are lowered into the fifth and fourth positions respectively, they engage limit switches 154 and 152 respectively to energize motor 137 and cause the first and second plasterboards to be moved toward the take-away conveyor B, only a portion of which is shown. The first and second plasterboard pass over switches 155, 153, respectively, to keep the electric drive motor 137 of the discharge conveyor energized, even though their trailing edges pass over and release switches 154 and 152, until such time as their trailing edges clear the transfer mechanism. At this time, the limit switches 153 and 155 are opened and the discharge conveyor F is stopped.

While the discharge conveyor F was being operated to remove the first and second plasterboards, the third plasterboard was being flipped over into the third position by the overturning mechanism D, and a fourth plasterboard was being fed to the first position by the feed and receiving conveyors A, E. When the trailing edge of the fourth plasterboard passes the feeler arm 140, the endless belts 10 are again raised and started and the cycle repeated. Provision is made in the present instance to permit an operator inspecting the plasterboards being handled by the machine, to depress a button 160 and cause a defective plasterboard to be run off the end of the receiving conveyor E without advancing any of the other plasterboards positioned on the transfer mechanism.

*Wiring diagram*

Figure 5:
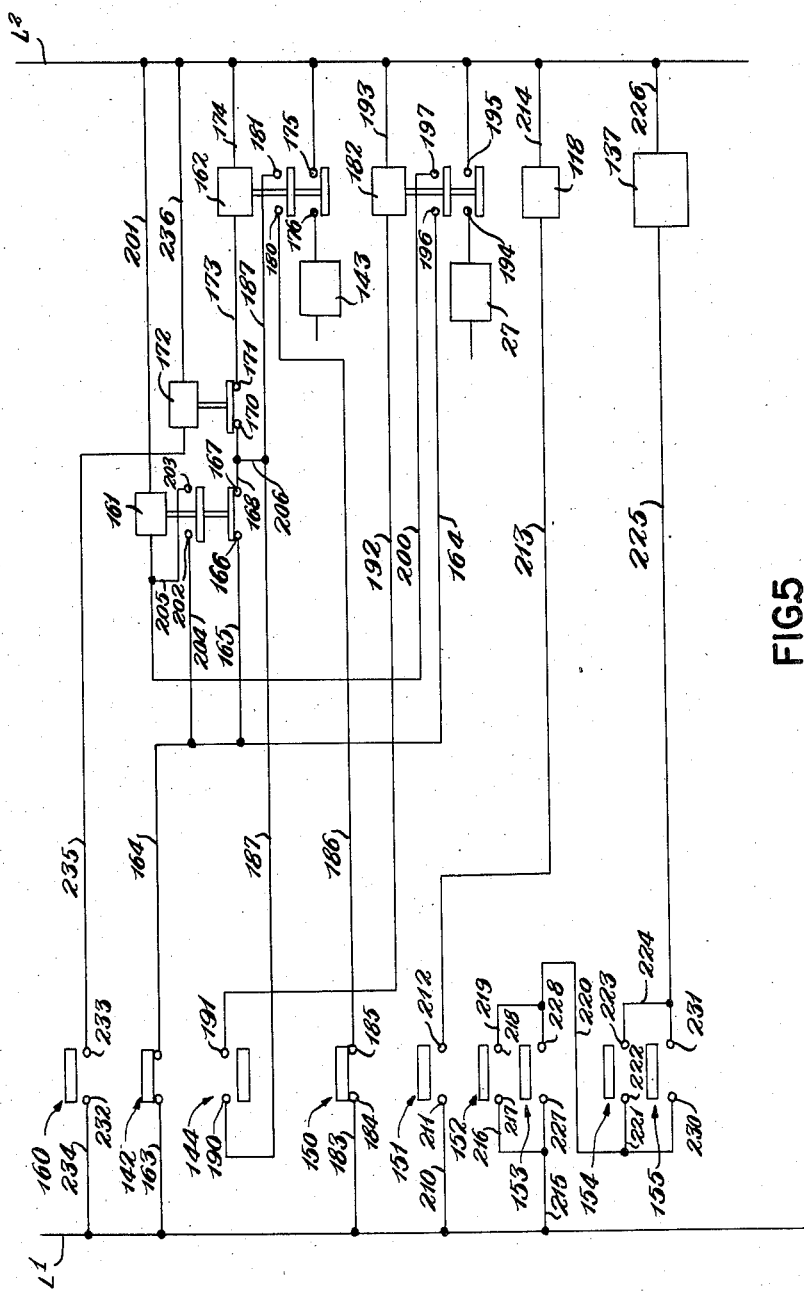
Fig. 5 is a schematic wiring diagram of the automatic controls for the machine.

Referring to the schematic wiring diagram shown in Fig. 5 and illustrating one manner of connecting the control devices described above, when the leading edge of a plasterboard being fed to the transfer mechanism contacts the feeler arms 140 it opens switch 142, thereby deenergizing the holding circuit of relay 161 which was closed by the previous cycle of the machine. When the trailing edge of a plasterboard passes the feeler arms 140, switch 142 is returned to its normally closed position energizing relay 162 through wires 163, 164, 165, contacts 166, 167 of relay 161, wire 168, contacts 170, 171 of relay 172, and wires 173 and 174. This causes relay 162 to pick up, closing contacts 175, 176 to energize the solenoid in the air supply line to the fluid pressure motor 41. At the same time, contacts 180, 181 of relay 162 are also closed and upon the shoes 22 being lifted by the fluid pressure motor 41, the normally open switch 144 is closed to energize the solenoid 182 through wire 183, contacts 184, 185 of switch 150, wire 186, contacts 180, 181, wire 187, contacts 190, 191 of switch 144 and wires 192 and 193. Solenoid 182 thereupon picks up to close contacts 194, 195 to energize the starter 27 of the drive motor for the belts 10. At the same time, solenoid 182 closes contacts 196, 197 to energize solenoid 161 through wires 164, 200 and 201. Relay 161 picks up to close its holding circuit through contacts 202, 203 and wires 164, 204, 205, 200 and 201. This opens contacts 166, 167 but the relay 162 is held in by wires 187, 206 and 168 such that the belts continue to be held in their up positions.

When the plasterboards reach their second positions, they open switch 150 deenergizing relays 162 and 182 to lower the belts and stop their drive motor. As the plasterboards are lowered, they close switch 151 to energize solenoid 120 of the clutch 73 of the overturning mechanism D through wires 210, contacts 211, 212, wires 213 and 214. The plasterboards are overturned and placed in the third position. The previous cycle is repeated until plasterboards are moved into the fourth and fifth positions, whereupon switches 152 and 154 are closed to energize the starter 137 of the motor of like number through wires 215, 216, contacts 217, 218 of switch 152, wires 219, 220, 221, contacts 222, 223 of switch 154 and wires 224, 225 and 226.

The discharge conveyor F causes the plasterboards to close switches 153 and 155 to keep motor 137 energized through wire 215, contacts 227, 228 of switch 153, wire 220, contacts 230, 231 of switch 155 and wires 225 and 226. Switches 152 and 154 are first opened by the ends of the plasterboards and after the trailing edges of the plasterboards have left the transfer mechanism, switches 153 and 155 are opened to stop the discharge conveyor.

As previously described an operator may depress the button 160 to cause a defective plasterboard being fed to the receiving conveyor E to be discharged off the end of the conveyor. The closing of switch 160 closes contacts 232, 233 to energize solenoid 172 through wires 234, 235 and 236, thereby opening contacts 170, 171. This prevents solenoid 162 from being energized when the edge of the plasterboard passes fingers 140 such that the endless belts 10 are not raised to advance the plasterboards on the transfer mechanism into their next positions. Button 160 is held down until the next good plasterboard is beneath the fingers 140, whereupon the button 160 may be released and the control again permitted to function as before.

While the invention has been described as embodied in a device for overturning and transferring plasterboards between two parallel spaced apart conveyors, it is not so limited. The overturning device need not be used in conjunction with other conveyors, and where it is used in conjunction with feed and take-away conveyors, they need not be arranged as shown and described. The feed and take-away conveyors may lie on opposite sides of the transfer mechanism so long as they are aligned with the receiving and discharge conveyors respectively, in which case, the direction of feed of one of either the receiving or discharge conveyors will have to be changed such that the feed and receiving conveyors feed in the same direction and such that the discharge and take-away conveyors feed in the same direction. Furthermore, the transfer device might be fed from a direction in line with the endless belts, in which case the receiving conveyor would be changed from a roller conveyor as shown to some other type of conveyor such as a plurality of endless belts, one end of the individual belts of which would take the place of the rollers of the receiving conveyor shown. Similarly, the discharge conveyor might be changed to a series of endless belts extending in line with the endless belts of the transfer mechanism, in which case the plasterboards or the like would not be removed in pairs situated one beside the other but in tandem relationship with the length of the plasterboards extending across the take-away conveyor.

From the foregoing, it will be apparent that the objects heretofore enumerated and others have been accomplished and that there has been provided novel and improved apparatus for overturning and/or transferring plasterboard and the like. While the preferred embodiment of the invention has been described with considerable detail, the invention is not limited to the particular construction shown and it is the intention to cover hereby all adaptations, modifications and uses thereof which come within the practice of those skilled in the art to which the invention relates and the scope of the appended claims.

Having thus described my invention, I claim:

1. In a material handling apparatus of the character described adapted to support plasterboard and the like in at least four aligned positions spaced side by side, a frame, a plurality of spaced parallel conveyor members extending across said four positions, first conveyor means overlapping with said plurality of conveyor members for supporting and moving a plasterboard into the first position, a leading row of normally generally horizontally positioned lever-like members positioned between said spaced parallel conveyor members and having a row of plasterboard supporting surfaces lying in the second position, a trailing row of normally generally horizontally positioned lever-like members positioned between said spaced parallel conveyor members and having a row of plasterboard supporting surfaces lying in the third position, means hingeably connecting said rows of lever-like members to said frame along axes adjacent to the juxtaposed side edges of said second and third material supporting positions, means for raising the plasterboard supporting surfaces of said lever-like members simultaneously to a generally vertical position and thereafter lowering the same to their generally horizontal positions, second power driven conveyor means overlapping with said plurality of conveyor members for supporting and removing a plasterboard from the fourth position, means for moving said plurality of spaced parallel conveyor members to advance material positioned thereon from one position to the next, and means for controlling the operation of said second and third-mentioned means for causing said parallel conveyor members to move the plasterboards in stepwise progression through said positions and for causing said second-mentioned means to overturn and advance the plasterboards from the second position to the third position intermediate the times that the plasterboards are being advanced by said plurality of conveyor members.

2. In a material handling apparatus of the character described adapted to support plasterboard and the like in at least four aligned positions spaced side by side, a frame, a plurality of spaced parallel endless belts extending across said four positions, means for supporting the portions of the top reaches of said endless belts extending across said four positions in a normal horizontal position and adapted to raise said portions of said top reaches of said endless belts to an elevated horizontal position, first conveyor means overlapping with a plurality of endless belts for supporting and moving plasterboards into the first position with the top material supporting surface thereof positioned between said normal and elevated positions of said top reaches of said endless belts, leading and trailing rows of normally generally horizontally positioned lever-like members in said second and third positions and positioned between said spaced parallel endless belts with their top surface at an elevation between the normal and elevated positions of said endless belts, means hinging said lever-like members to said frame for pivotal movement about spaced parallel axes along the adjacent sides of said rows of lever-like members, means for raising said lever-like members simultaneously to a generally vertical position and thereafter lowering the lever-like members to their horizontal position, second power driven conveyor means overlapping with said endless belts for supporting and removing plasterboards from said fourth position with the top material supporting surface of said second conveyor means positioned between said normal and elevated positions of said top reaches of said endless belts, and means for controlling the operation of said first and third-mentioned means whereby said endless belts move the plasterboards in stepwise progression through said plasterboard supporting positions and whereby said third-mentioned means overturns and advances the plasterboards from said second position to said third position intermediate the times that the plasterboards are being advanced by said endless belts.

3. In a material handling apparatus of the character described adapted to support plasterboard and the like in at least four aligned positions spaced side by side, a frame, a plurality of spaced parallel endless belts extending across said four positions, means for supporting the portions of the top reaches of said belts extending across said four positions in a first horizontal position and adapted to raise said portions of said top reaches of said endless belts to an elevated position, a first roller conveyor in said first position with the individual rollers thereof positioned between said endless belts and with the tops of the rollers positioned between said first and elevated positions of said endless belts, a leading row of normally generally horizontally positioned lever-like members positioned between said endless belts and having a row of material supporting surfaces lying in the second position at an elevation between said first and elevated positions of said endless belts, a trailing row of normally generally horizontally positioned lever-like members positioned between said endless belts and having a row of material supporting surfaces lying in the third position at an elevation between said first and elevated positions of said endless belts, means hingably connecting said rows of lever-like members to said frame for pivotal movement about axes positioned adjacent to the juxtaposed sides of said second and third material supporting positions, means for raising the plasterboard supporting surfaces of said lever-like members simultaneously to a generally vertical position and thereafter lowering them to their horizontal positions, a second power driven roller conveyor in said fourth position with the individual rollers positioned between said endless belts and with their top surface at an elevation between said first and elevated positions of said endless belts, and means for controlling the operation of said first and third-mentioned means whereby said endless belts move the plasterboards in stepwise progression through said positions and whereby said third-mentioned means overturns and advances the plasterboards from said second position to said third position intermediate the times that the plasterboards are being advanced by said endless belts.

4. In a material handling apparatus of the character described for transferring plasterboards and the like between two spaced apart conveyors and having five plasterboard supporting positions spaced side by side in aligned relationship, first means for successively moving plasterboards from one of said conveyors into the first plasterboard supporting position of said material handling apparatus, second means for moving the plasterboards from the first to the second positions and from the third to the fourth and fifth positions, third means for overturning and advancing plasterboards from the second position to the third position, fourth means for actuating said second means to move the plasterboards from one of said positions to the next each time a plasterboard has been moved into the first position, fifth means for actuating said third means when a plasterboard is moved into the second position, and sixth means for removing a pair of plasterboards in side-by-side relationship for the fourth and fifth positions to the other of said spaced apart conveyors after said second means has moved a plasterboard into each of said fourth and fifth positions.

5. In a material handling apparatus for transferring plasterboard and the like from a feed conveyor to a take-away conveyor and having five plasterboard supporting positions spaced side by side in aligned relationship, a frame, a plurality of spaced parallel conveyor members extending across said five positions, first conveyor means overlapping with said plurality of conveyor members for supporting and moving a plasterboard into the first position, a leading row of normally generally horizontally positioned lever-like members positioned between said spaced conveyor members and having a row of plasterboard supporting surfaces lying in the second position, a trailing row of normally generally horizontally positioned lever-like members positioned between said spaced parallel conveyor members and having a row of plasterboard supporting surfaces lying in the third position, means hingably connecting said leading and trailing rows of lever-like members to said frame for pivotal movement about axes positioned adjacent the juxtaposed sides of said second and third material supporting positions, means for raising the plasterboard supporting surfaces of lever-like members simultaneously to a generally vertical position and thereafter lowering them to their horizontal positions, second power driven conveyor means overlapping with said plurality of conveyor members for supporting and removing plasterboards from the fourth and fifth positions in side-by-side relationship, means for moving said plurality of spaced parallel conveyor members to cause plasterboards to advance from the first to the second position and from the third to the fourth and fifth positions, and means for controlling the operation of said second and third-mentioned means for causing said parallel conveyor members to move the plasterboards in stepwise progression through said positionss and for causing said second-mentioned means to overturn the plasterboards as they are moved thereby from the second position to the third position.

6. In a material handling apparatus for transferring plasterboard and the like from a feed conveyor to a take-away conveyor and having five plasterboard supporting positions spaced side by side in aligned relationship, a frame, a plurality of spaced parallel conveyor members extending across said five positions, a receiving conveyer overlapping with said plurality of conveyor members for supporting and moving a plasterboard into the first position, a leading row of normally generally horizontally positioned lever-like members positioned between said spaced conveyor members and having plasterboard supporting surfaces lying in the second position, a trailing row of normally generally horizontally positioned lever-like members positioned between said spaced parallel conveyor members and having plasterboard supporting surfaces lying in the third position, means hingeably connecting said leading and trailing rows of lever-like members to said frame for pivotal movement about spaced axes positioned adjacent the juxtaposed side edges of said second and third material supporting positions, means for raising the plasterboard supporting surfaces of said lever-like members simultaneously to a generally vertical position and thereafter lowering them to their horizontal positions, a delivery power driven roller conveyor extending across the fourth and fifth positions with the individual rollers thereof positioned between said spaced parallel conveyor members for supporting and delivering a pair of plasterboards simultaneously from the fourth and fifth positions of said apparatus in side-by-side relationship to said take-away conveyor, means for moving said plurality of spaced conveyor members to cause the plasterboards to advance from the first position to the second position and from the third position to the fourth and fifth positions, and means for controlling the operation of said second and third-mentioned means for causing said parallel conveyor members to move the plasterboards in stepwise progression through said positions and for causing said second-mentioned means to overturn the plasterboards as it advances them from the second to the third position.

7. In a material handling apparatus for transferring plasterboards and the like from a feed conveyor to a take-away conveyor and having five plasterboard supporting positions spaced side by side in aligned relationship, a receiving power driven roller conveyor for successively moving plasterboards from the feed conveyor into the first position at the feed side of said apparatus, a delivery power driven roller conveyor extending across the fourth and fifth positions adjacent to the take-away side of said apparatus for delivering a pair of plasterboards simultaneously from said apparatus in side-by-side relationship to the take-away conveyor, a plurality of power driven endless belts extending across said five positions of said apparatus with the top reach of the belts normally extending between the individual rollers of said receiving and delivery conveyors beneath the tops thereof, first and second rows of normally generally horizontally positioned lever-like members extending across said second and third positions, respectively, the individual lever-like members of which are positioned between said spaced parallel endless belts, means hinging said lever-like members to said frame for pivotal movement about spaced axes extending transversely of said belts along the adjacent edges of said first and second rows of lever-like members, a plurality of belt supporting members extending across said positions of said apparatus the individual members of which are positioned beneath the top reach of the individual endless belts, means for moving said belt supporting members above said receiving and delivery conveyors and said first and second rows of lever-like members, a pair of generally horizontal shafts positioned beneath said lever-like members, a plurality of radially projecting levers on each of said shafts, connecting means between the individual ones of said levers and the individual ones of said lever-like members, means adapted to rotate said shafts simultaneously for raising said lever-like members to a generally vertical position and thereafter lowering them to their generally horizontal position, means responsive to a plasterboard being positioned in the first position for causing said second-mentioned means to raise said belt supporting members for the period of time required for said plurality of endless belts to move plasterboards positioned thereon from one plasterboard supporting position to the next, means responsive to a plasterboard being placed in said second position for actuating said third-mentioned means, and means responsive to plasterboards being placed in said fifth position for actuating said delivery power driven roller conveyor.

References Cited in the file of this patent

UNITED STATES PATENTS

| | | |
|---|---|---|
| 591,712 | Worth | Oct. 12, 1897 |
| 1,929,204 | Jeffrey et al. | Oct. 3, 1933 |
| 1,954,278 | Adams | Apr. 10, 1934 |
| 1,970,749 | Heichert | Aug. 21, 1934 |
| 2,527,024 | Mitchell | Oct. 24, 1950 |